(12) United States Patent
Su et al.

(10) Patent No.: US 8,333,169 B2
(45) Date of Patent: Dec. 18, 2012

(54) WATER HEATER SPECIAL FOR BATHROOM

(76) Inventors: Shaohua Su, Shanxi (CN); Qing Tan, Shanxi (CN)

( * ) Notice: Subject to any disclaimer, the term of this patent is extended or adjusted under 35 U.S.C. 154(b) by 912 days.

(21) Appl. No.: 12/446,272

(22) PCT Filed: Jun. 13, 2007

(86) PCT No.: PCT/CN2007/001867
§ 371 (c)(1),
(2), (4) Date: Apr. 20, 2009

(87) PCT Pub. No.: WO2008/034321
PCT Pub. Date: Mar. 27, 2008

(65) Prior Publication Data
US 2010/0139579 A1    Jun. 10, 2010

(30) Foreign Application Priority Data
Sep. 15, 2006    (CN) .......................... 2006 1 0104570

(51) Int. Cl.
*F24H 1/00* (2006.01)
(52) U.S. Cl. ................... 122/18.1; 122/15.1; 122/13.01; 126/210; 126/5; 126/53; 126/54; 237/56; 392/465; 392/471; 392/441
(58) Field of Classification Search ............ 122/15.1, 122/18.1, 13.01; 126/210, 5, 53, 54; 237/56, 237/57, 59; 392/465, 471, 478, 480–496, 392/441, 456
See application file for complete search history.

(56) References Cited

U.S. PATENT DOCUMENTS

| | | | | |
|---|---|---|---|---|
| 3,112,497 A | * | 12/1963 | Call | .................................. 4/415 |
| 3,543,294 A | * | 11/1970 | Boester | ......................... 210/620 |
| 5,345,625 A | * | 9/1994 | Diemand | .......................... 4/665 |

FOREIGN PATENT DOCUMENTS

| | | |
|---|---|---|
| CN | 2598493 Y | 1/2004 |
| CN | 1686037 A | 10/2005 |
| CN | 2832018 Y | 11/2006 |
| CN | 2832019 Y | 11/2006 |
| CN | 100390464 C | 5/2008 |
| DE | 3223422 | 1/1984 |
| DE | 10143911 | 3/2003 |
| DE | 202004011243 | 12/2004 |
| GB | 2160628 | 12/1985 |
| JP | 2002-35738 | 2/2002 |

(Continued)

OTHER PUBLICATIONS

Mar. 27, 2008, PCT ISR for PCT/CN2007/001867.

(Continued)

*Primary Examiner* — John K Fristoe, Jr.
*Assistant Examiner* — Minh Le
(74) *Attorney, Agent, or Firm* — Neifeld IP Law, PC

(57) ABSTRACT

A water heater especially for bathroom includes a hair filter (1), a water self pumping pump (2), a heat exchanger (3), a water valve (5), a controller (6), an operator (7), three water flow resistance amplifiers (8) and a waste water tank (9). The heat exchanger can recover the heat from the waste water during bathing and preheat cold water. The waste water tank can reuse the waste bath water for flushing toilets. Said parts are assembled by pipes and electric circuits and arranged on the proper position in the bathroom.

9 Claims, 6 Drawing Sheets

FOREIGN PATENT DOCUMENTS

| | | |
|---|---|---|
| JP | 2002-102993 | 2/2002 |
| NL | C 1011371 | 11/2000 |

OTHER PUBLICATIONS

Mar. 17, 2009, English Translation of PCT International Preliminary Report on Patentability for PCT/CN2007/001867.

Mar. 17, 2009, Chinese Version of PCT International Preliminary Report on Patentability for PCT/CN2007/001867.

Mar. 15, 2009, English Translation of PCT Written Opinion of the International Search Authority for PCT/CN2007/001867.

Mar. 15, 2009, Chinese Version of PCT Written Opinion of the International Search Authority for PCT/CN2007/001867.

* cited by examiner

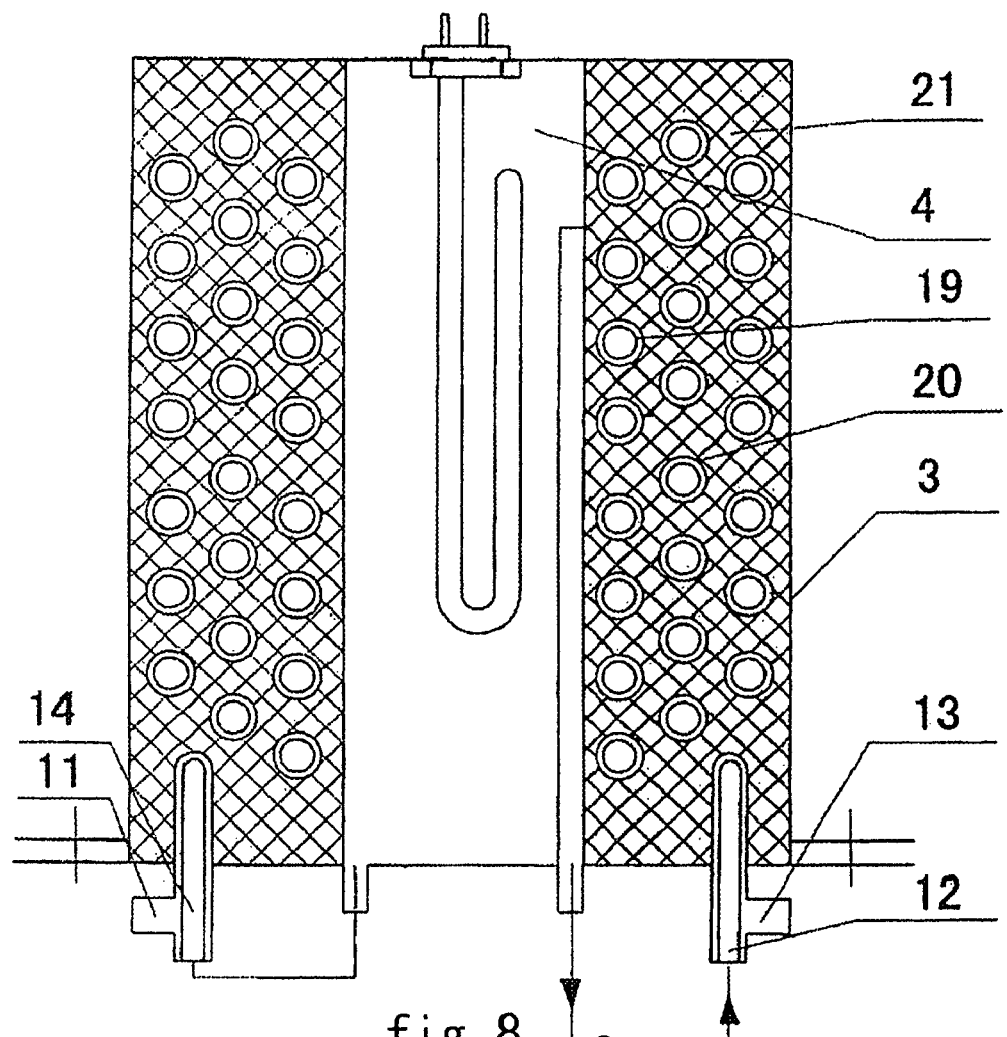
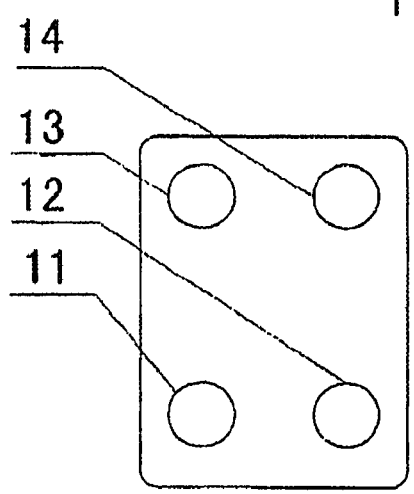
fig. 6
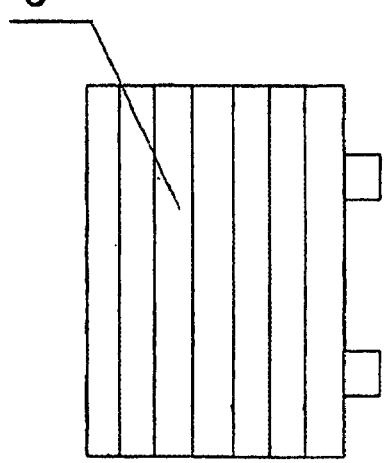
fig. 7
fig. 8

A-direction

WATER HEATER SPECIAL FOR BATHROOM

This application is a US national stage entry of PCT application PCT/CN2007/001867, filed, Jun. 13, 2007, now published as WO/2008/034321, which claims priority to Chinese application 200610104570.0, filed Sep. 15, 2006.

TECHNICAL FIELD

The present invention relates to the technical field of shower and especially to an energy and water saving water heater that can compose an integrated structure together with a bathroom, retrieve the heat in the waste hot water generated during bathing, and reuse waste water.

BACKGROUND ART

Nowadays, the bathroom with a base (base tub) having different shape and different size is entering into the families of ordinary people at a universal type. However, when used, source of hot water or a water heater needs to be configured while consumers buying a bathroom. Nowadays, there is neither a water heater that can compose an integrated structure offered particularly for a bathroom, nor an energy and water saving water heater particularly matched with various bathrooms.

CONTENTS OF THE INVENTION

The object of the present invention is to overcome the disadvantages of the prior art and provide an energy and water saving water heater that can compose an integrated structure together with a bathroom, retrieve the heat in the waste hot water generated during bathing, and reuse waste water. The water heater perfects the function of a bathroom, provides convenience to consumers and saves water recourses and electricity recourses.

The solution to achieve the object of the present invention is as follows: an energy and water saving water heater that can compose an integrated structure together with bathroom having different size and shape includes a hair filter, a water self pumping pump, a heat exchanger, a heater, a water valve, a controller, an operator, three water flow resistance amplifiers, a waste water tank and pipes. The hair filter is installed at the water outlet of the base (base tub) of a bathroom; the water self pumping pump, the heat exchanger, the heater and the controller can be installed together or separately in the empty cavity located at the lower part of the base (base tub) of the bathroom, or at the position for installing which is on the side wall or on the upper part of the base behind the back wall of the bathroom; the operator is arranged on the position on the inside wall or on the back wall which is convenient to operate; the waste water tank is installed on the outside top of the bathroom or on the wall above the toilet in the washroom of users and can provide the toilet with water automatically by taking advantage of the height difference. The water self pumping pump has a water inlet pipe-jointed with the hair filter and a water outlet pipe-jointed with the waste water inlet of the heat exchanger; the waste water outlet of the heat exchanger pipe-joints with the waste water inlet of the water tank, the waste water outlet of the water tank pipe-joints with the water inlet of the toilet of users, and the overflow port of the water tank pipe-joints with the waste water tank or water pipeline; the tap water inlet of the heat exchanger pipe-joints with the water outlet port of the tap water inlet valve of the bathroom, the water inlet port of the tap water inlet valve of the bathroom pipe-joints with the tap water pipeline of users after serially pipe-jointing with a water flow resistance amplifier, the tap water outlet pipe-joints with the water inlet of the heater after serially pipe-jointing with another water flow resistance amplifier, the water outlet of the heater pipe-joints with the bath shower in the bathroom after serially pipe-jointing with a water flow resistance amplifier, the water valve is serially pipe-jointed on the proper position of the tap water pipeline of the water heater through a tube, the controller has an input port electrically connected to the power of users, and an output port electrically connected to the water self pumping pump, the heater, the water valve and the operator.

During bathing, the bath water falls onto the base (end tub) of the bathroom through human bodies, via the hair filter located at the lower water outlet, is pumped into the water self pumping pump and is strongly discharged into the heat exchanger to expel the heat into the waste water tank to store for flushing the toilet. When the water tank is full of water, the redundant waste water, via the overflow port, flows into the water tank of users to reserve or enter into the water pipeline. At the same time, after the tap water enters into the heat exchanger to absorb the heat, it flows toward the heater and then is heated into bath water to flows toward the bath shower for users to bath. The said process goes ahead along with the course of bathing promptly and continuously.

When the system is connected to power, the tap water flows through the water valve, the water valve stays on, and then the water self pumping pump and the heater start to work; close the tap water, the water valve stays off, and then the water self pumping pump and the heater stop work. The water valve achieves that water and electricity act depending on each other, which makes it convenient to operate and prevents the heater from dry heating.

The heat exchanger adopts double-pipe heat exchanger or plate heat exchanger. The double-pipe heat exchanger comprises red copper pipe or aluminum pipe as the inner pipe and corrugated plastic flexible pipe as the outer pipe which are winded into spiral; and the polyurethane insulation material or rock wool is filled into the gaps among the pipes in the shell. If the plate structure is used, the plate heat exchanger comprises red copper sheet, stainless steel sheet, aluminum sheet or galvanized steel sheet or other type of metal sheet as the partition. Two types of fluid flow among the plates, and the shape thereof can be winded into spiral or formed into the shape of overlapping plate-like, which is separately called spiral-plate heat exchanger and flat-plate heat exchanger.

The heater can be formed to compose an integrated structure with the heat exchanger; it also can be formed to compose an integrated structure together with the controller, the water valve and the water flow resistance amplifiers, the connection relationship among which does not change in order to make it convenient to be manufactured installed and to utilize the configuration position of the bathroom properly. The heater can use electricity energy or fuel gas heat energy and is designed to work under multiple adjustable power levels of 1 kw, 2 kw and 3 kw.

The water flow resistance amplifiers is water pass-by pipelines sequence made of plastic insulation materials and can be composed with only one pipe or multiple pipes serially connected to each other. Regarding the water flow flowing through the pipelines as conductor, when the cross-area of the water pass-by pipelines is determined, the resistance of the conductor flowing from one port of the pipelines sequence to the other increases as the length of the pipelines sequence, which makes the voltage and current of the conductor decrease correspondingly to a point within a value range of ensuring the security of human body. The length of the pipelines sequence can be calculated precisely by using Ohm's law or conductor resistance formula.

The type of the pipelines sequence can be one-pipe or multi-pipe serially connected to each other. The principles of defending electricity leakage of the water flow resistance amplifiers can be referred as water heater defending electricity leakage attenuation isolation technique.

BENEFICIAL EFFECT OF THE INVENTION

1. It has a simple structure as integrated or separated and can be composed into an integrated structure with bathrooms having various kinds of shapes and sizes according to the detailed structure and position of the base or back of the bathrooms, which make a bathroom itself has the function of energy and water saving water heater and becomes a real bathroom and provide consumers with convenience.

2. The temperature difference between the tap water after preheating and the bath water is rather small, which makes the power for heating decreases correspondingly by more than two thirds; the electricity consumption decreases correspondingly by more than two thirds also.

3. Waste water can be retrieved for the second use just like flushing toilets and sweeping the floor, which saves the water being used.

4. It utilizes power of 2 kw to implement the effect of bathing under power of 6 kw. It can be used to bath at the point of working under a low power. The use of hot water is not limited by time. The hot water can be used continuously. All the mentioned-above make it of convenience and saving.

5. The attenuation isolation technique eliminates hidden dangers completely.

6. Water and electricity act depending on each other. The power is adjustable. The operation and use are very convenient.

DESCRIPTION OF FIGURES

FIG. 6 illustrates the front view of the schematic diagram of the structure of the flat-plate heat exchanger;

FIG. 7 illustrates the left view of the schematic diagram of the structure of the flat-plate heat exchanger;

FIG. 8 illustrates the schematic diagram of the integrated structure formed by the double-pipe heat exchanger and heater;

wherein: 1. hair filter; 2. water self pumping pump; 3. heat exchanger; 4. heater; 5. water valve; 6. controller; 7. operator; 8. water flow resistance amplifiers; 9. waste water tank; 10. water inlet of water tank; 11. waste water inlet of heat exchanger; 12. tap water inlet of heat exchanger; 13. waste water outlet of heat exchanger; 14. tap water outlet of heat exchanger; 15. water outlet of water tank; 16. overflow port of water tank; 17. base of bathroom; 18. shower head in bathroom; 19. inner pipe of red copper pipe; 20. outer pipe of corrugated pipe; 21. polyurethane insulation material; 22. shell; 23. water inlet; 24. interface of water outlet; 25. upper cover of filter; 26. filter body itself; 27. fastening nut; 28. filter net; 29. plastic pad.

DETAILED MODE OF CARRYING OUT THE INVENTION

Hereafter will describe the representative embodiments of the present invention in detail with reference to the figures, which are intended to be in the nature of description rather than of limitation of the scope of the present invention.

Figure 1:
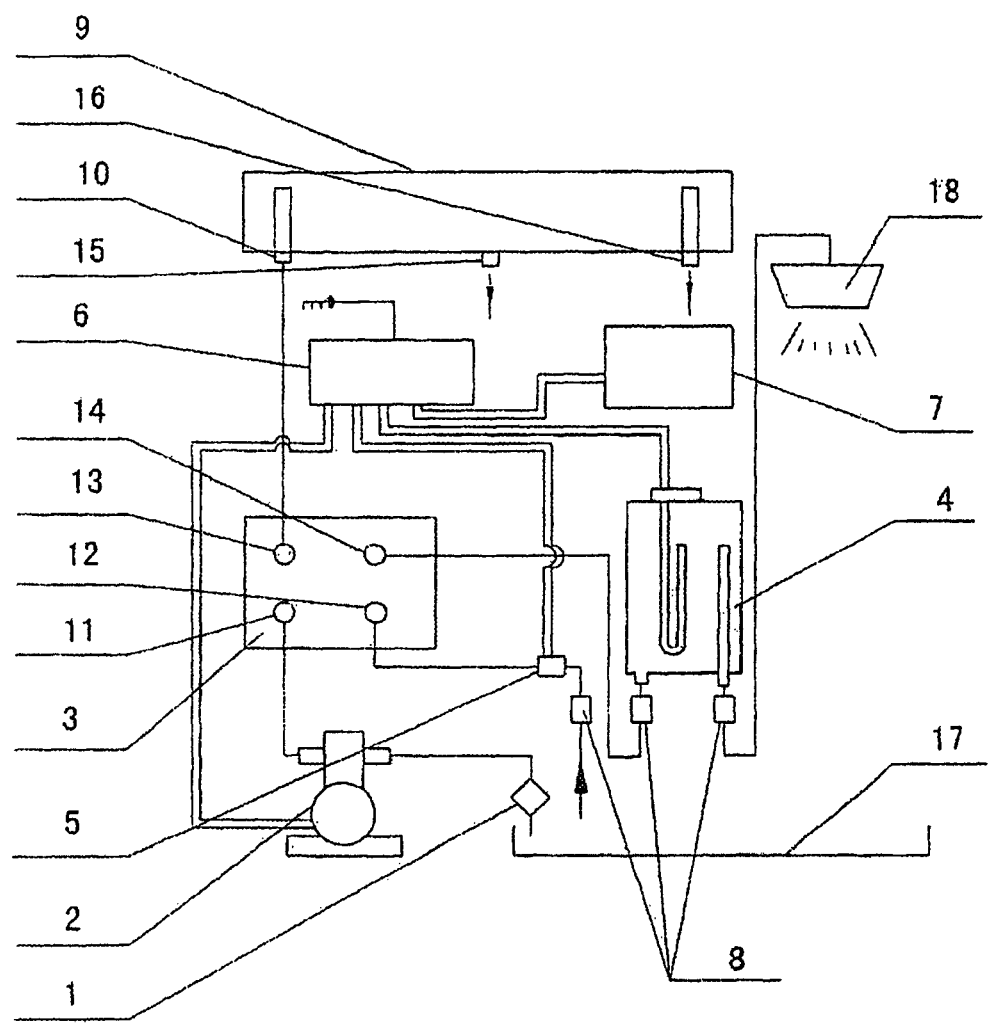
FIG. 1 illustrates the schematic diagram of the structure and the connections of the electric circuit of the pipelines sequence among the parts of the preferable mode of the Invention.

FIG. 1 is a schematic diagram of the structure and the connections of the electric circuits of the pipelines sequence among the parts of the preferable mode of the Invention. Wherein, 1 represents hair filter, 2 represents water self pumping pump, 3 represents heat exchanger, 4 represents heater, 5 represents water valve, 6 represents controller, 7 represents operator, 8 represents water flow resistance amplifiers, 9 represents waste water tank, 10 represents water inlet of water tank, 11 represents waste water inlet of heat exchanger, 12 represents tap water inlet of heat exchanger, 13 represents waste water outlet of heat exchanger, 14 represents tap water outlet of heat exchanger, 15 represents water outlet of water tank, 16 represents overflow port of water tank, 17 represents base of bathroom (base tub), 18 represents shower head in bathroom.

Hair filter 1 is installed at the water outlet of the base of a bathroom; water self pumping pump 2, heat exchanger 3, heater 4 and controller 6 can be installed together or separately in the empty cavity located at the lower part of the base of the bathroom, or at the position for installing which is on the side wall or on the upper part of the base behind the back wall of the bathroom; the operator 7 is arranged on the position on the inside wall or on the back wall which is convenient to operate; the waste water tank 9 is installed on the outside top of the bathroom or on the wall above the toilet in the washroom of users and can provide the toilet with water automatically by taking advantage of the height difference. The water self pumping pump 2 has a water inlet pipe-jointed with the hair filter 1 and a water outlet pipe-jointed with the waste water inlet 11 of the heat exchanger 3; the waste water outlet 13 of the heat exchanger 3 pipe-joints with the waste water inlet 10 of the water tank 9, the waste water outlet 15 of the water tank 9 pipe-joints with the water inlet of the toilet of users, and the overflow port 16 of the water tank pipe-joints with the waste water tank or water pipeline; the tap water inlet 12 of the heat exchanger 3 pipe-joints with the water outlet port of the tap water inlet valve of the bathroom, the water inlet port of the tap water inlet valve of the bathroom pipe-joints with the tap water pipeline of users after serially pipe-jointing with a water flow resistance amplifier 8, the tap water outlet 14 pipe-joints with the water inlet of the heater 4 after serially pipe-jointing with another water flow resistance amplifier 8; the water outlet of the heater 4 pipe-joints with the bath shower in the bathroom after serially pipe-jointing with a water flow resistance amplifier 8, the water valve 5 is serially pipe-jointed on the proper position of the tap water pipeline of the water heater through a tube, the controller 6 has a input port electrically connected to the power of users, and an output port electrically connected to the water self pumping pump 2, the heater 4, the water valve 5 and the operator 7.

Figure 2:
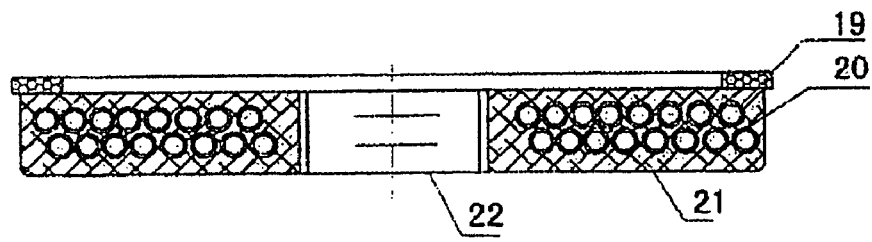
FIG. 2 illustrates the front section view of the schematic diagram of the structure of the double-pipe heat exchanger.

FIG. 2 is the front section view of the schematic diagram of the structure of the double-pipe heat exchanger. It can be seen from the figure that: the double-pipe heat exchanger 3 comprises a red copper pipe 19 as the inner pipe and a corrugated pipe 20 as the outer pipe which are winded into spiral and set in shell 22, polyurethane insulation material 21 is filled into the gaps among the pipes wherein.

Figure 3:
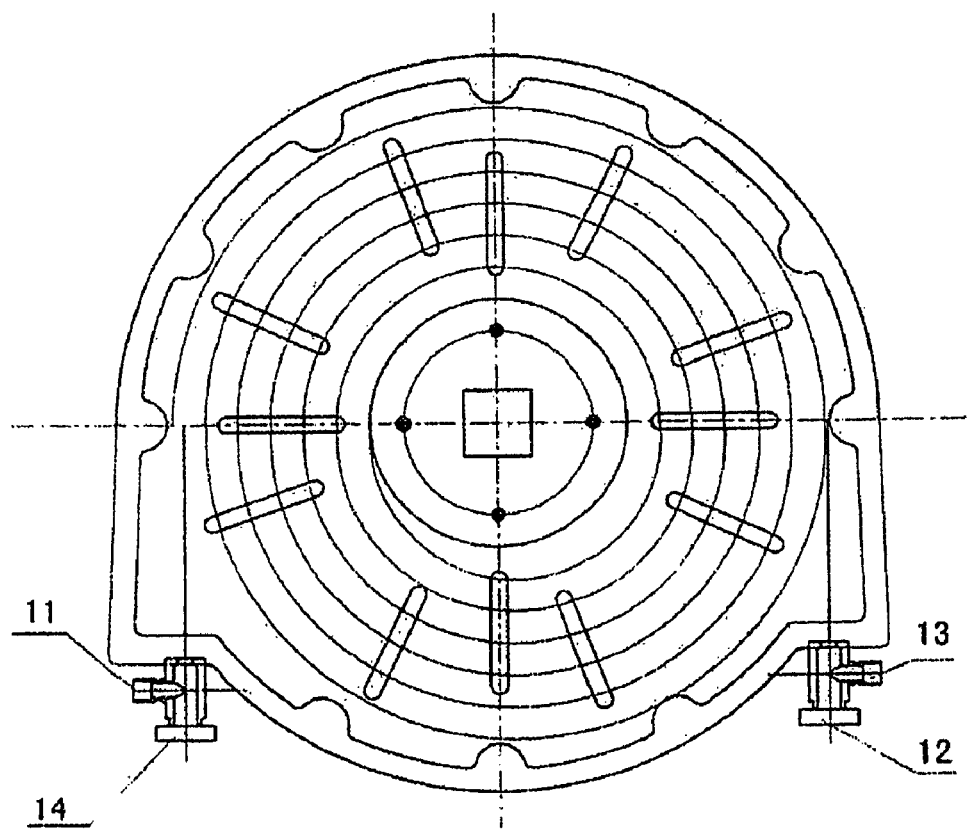
FIG. 3 illustrates the vertical view of the schematic diagram of the structure of the double-pipe heat exchanger.

FIG. 3 is the vertical view of the schematic diagram of the structure of the double-pipe heat exchanger. Wherein, 11 represents waste water inlet of heat exchanger, 12 represents tap water inlet of heat exchanger, 13 represents waste water outlet of heat exchanger, 14 represents tap water outlet of heat exchanger.

Figure 4:
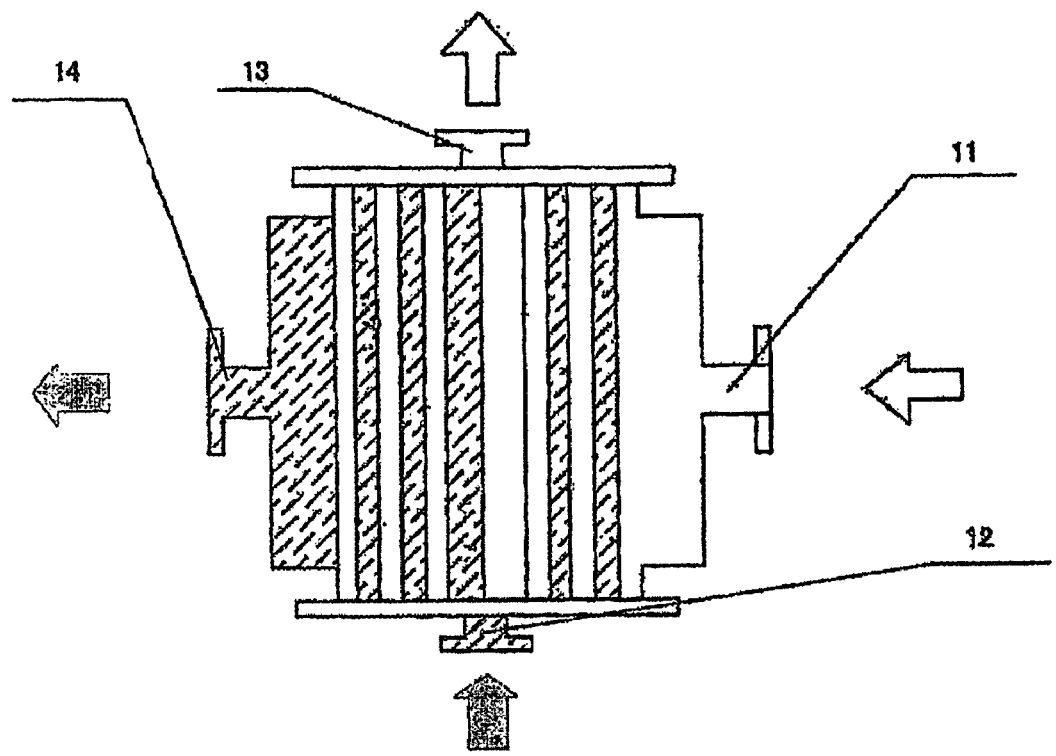
FIG. 4 illustrates the front view of the schematic diagram of the structure of the spiral-plate heat exchanger.

FIG. 4 is the front view of the schematic diagram of the structure of the spiral-plate heat exchanger. Wherein, 11 represents waste water inlet of heat exchanger, 12 represents tap water inlet of heat exchanger, 13 represents waste water outlet of heat exchanger, 14 represents tap water outlet of heat exchanger.

Figure 5:
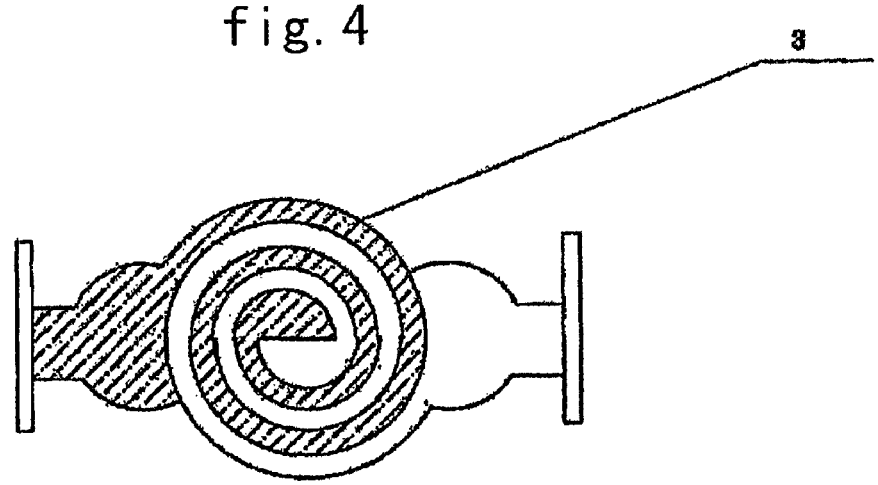
FIG. 5 illustrates the vertical view of the schematic diagram of the structure of the spiral-plate heat exchanger.

FIG. 5 is the vertical view of the schematic diagram of the structure of the spiral-plate heat exchanger. Wherein, 3 represents heat exchanger.

FIG. 6 is the front view of the schematic diagram of the structure of the flat-plate heat exchanger. Wherein, 11 represents waste water inlet of heat exchanger, 12 represents tap water inlet of heat exchanger, 13 represents waste water outlet of heat exchanger, 14 represents tap water outlet of heat exchanger.

FIG. 7 is the left view of the schematic diagram of the structure of the flat-plate heat exchanger. Wherein, 3 represents heat exchanger.

FIG. 8 illustrates the schematic diagram of the integrated structure formed by the double-pipe heat exchanger and heater. wherein, 3 represents heat exchanger, 4 represents heater, 11 represents waste water inlet of heat exchanger, 12 represents tap water inlet of heat exchanger, 13 represents waste water outlet of heat exchanger, 14 represents tap water outlet of heat exchanger, 19 represents inner pipe of red copper pipe, 20 represents outer pipe of corrugated pipe that is winded into spiral, 21 represents polyurethane insulation material.

Figures 9, 10, 11, 12:
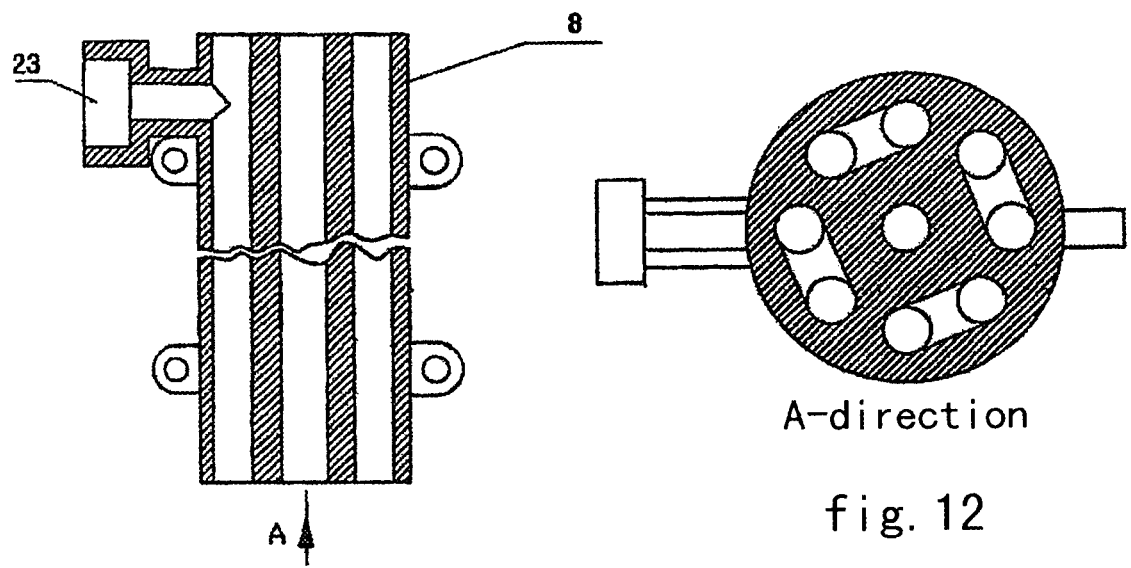
FIG. 9 illustrates the schematic diagram of the structure of one end cover of the plastic insulation of the water flow resistance amplifiers.
FIG. 10 illustrates the schematic diagram of the structure of the body itself of the plastic insulation of the water flow resistance amplifiers.
FIG. 11 illustrates the schematic diagram of the structure of the other end cover of the plastic insulation of the water flow resistance amplifiers.
FIG. 12 illustrates the A-direction schematic diagram of the structure of the body of the plastic insulation of the water flow resistance amplifiers.

FIG. 9 is the schematic diagram of the structure of one end cover of the plastic insulation of the water flow resistance amplifiers.

FIG. 10 is the schematic diagram of the structure of the body itself of the plastic insulation of the water flow resistance amplifiers. Wherein, 8 represents water flow resistance amplifiers. There is a water inlet 23 and nine through holes with the same diameter in the body itself which form nine water pass-by pipelines.

FIG. 11 is the schematic diagram of the structure of the other end cover of the plastic insulation of the water flow resistance amplifiers. In the figure, 24 represents the interface of water outlet set on the end cover.

FIG. 12 is the structure of the body itself of the plastic insulation of the water flow resistance amplifiers and is the A-direction section view schematic diagram.

Figure 13:
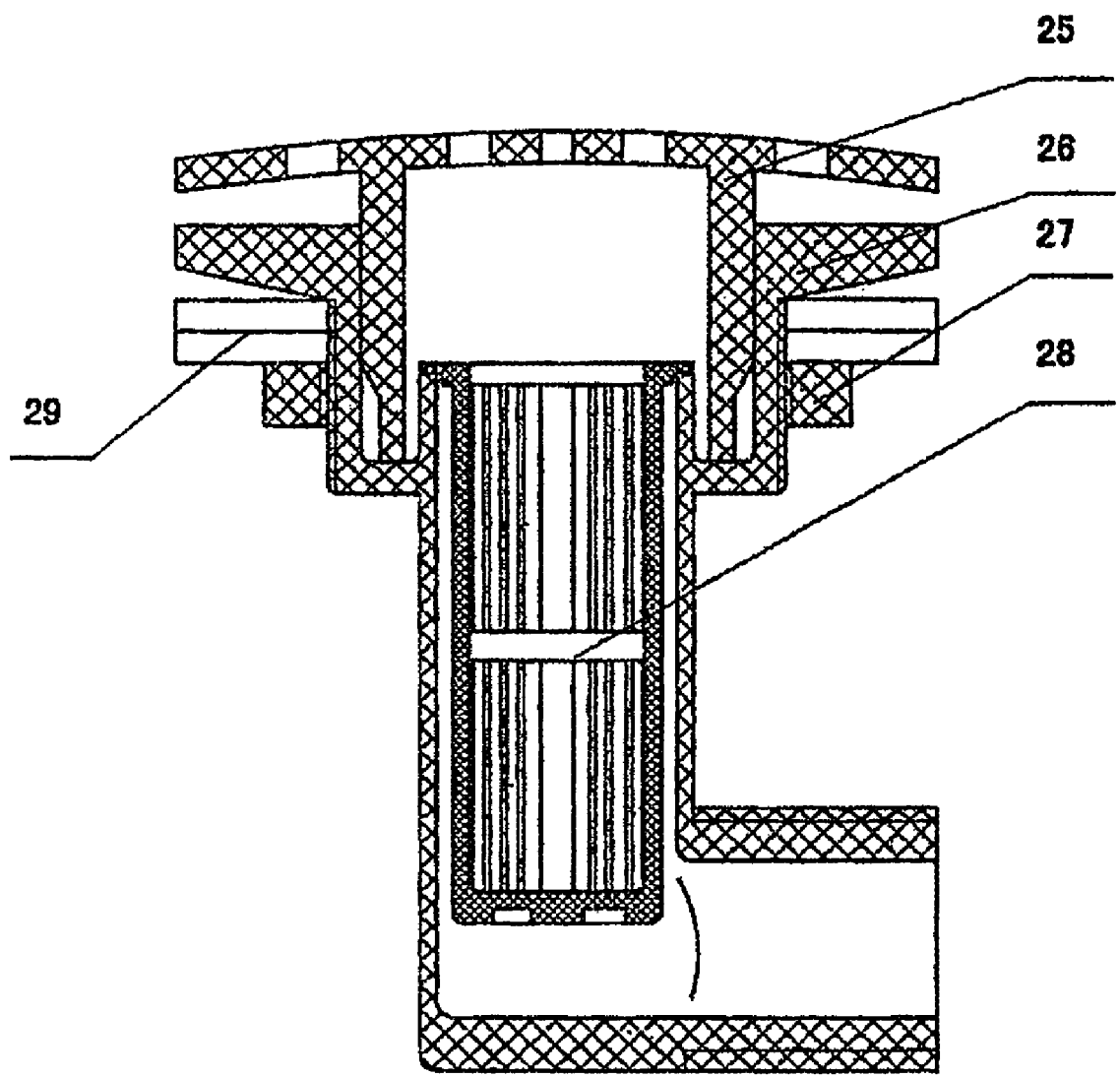
FIG. 13 illustrates the schematic diagram of the structure of the hair filter.

FIG. 13 is the schematic diagram of the structure of the hair filter. It can be seen from the figure that the hair filter 1 is consist of upper cover of filter 25, filter body itself 26, fastening nut 27, filter net 28 and plastic pad 29. It can be seen with reference to FIG. 1, heat exchanger 3 according to the present preferable mode adopts flat-plate heat exchanger, heater 4 adopts electric heater and has multiple adjustable power of 1 kw, 2 kw and 3 kw. Water flow resistance amplifiers 8 is composed with multiple pipes serially connected to each other, electric heater 4, two water flow resistance amplifiers 8, water valve 5 and controller 6 are arranged in the body of a small-type tank and are installed on the proper position on the side wall or behind the back wall of the bathroom after being electrically pipe-jointed accordingly, in order to make the whole structure compact and the connections reliable. The waste water tank 9 is arranged on the proper position above the toilet in the washroom of users, and pipe-joints with the water inlet of the toilet after installing a water valve at the water outlet 15 thereof. The overflow port of water tank 9 pipe-joints with the water pipelines of users. The hair filter 1 is installed at the lower water outlet port of base 17 of bathroom. The water self pumping pump 2 and heat exchanger 3 are installed in the empty cavity located at the lower part of the base of the bathroom, or at the proper position on the upper part of the base, the side wall or behind the back wall, separately. The operator 7 is installed at the position suitable for operation on the inside wall or the back wall in the bathroom and is electrically connected with controller 6. The water self pumping pump 2 is electrically connected to controller 6 and the water inlet thereof pipe-joints with hair filter 1, the water outlet thereof pipe-joints with water inlet 11 of heat exchanger 3. The water outlet 13 of heat exchanger pipe-joints with water inlet 10 of water tank 9, and tap water inlet 12 thereof pipe-joints with the tap water valve of the bathroom. The inlet port of the tap water valve pipe-joints with the tap water pipe of users after serially connecting to a water flow resistance amplifier 8, and the tap water outlet 14 thereof pipe-joints with the water inlet of electric heater 4 after serially connecting to water valve 5 and water flow resistance amplifier 8. The water outlet of electric heater 4 pipe-joints with the shower head of the bathroom after serially connected to a water flow resistance amplifier 8.

When the input port of controller 6 connects to the power of users and the tap water valve of bathroom is opened, the tap water flows toward shower head 18 via water valve 5. At this point, the electric circuits are turned on and the water pump and electric heater 4 start to work synchronously and then the water heater stays at the work status. When the tap water valve of bathroom is closed, which means the provision of the tap water is broken off, the water valve 5 cuts off the circuits automatically, water pump 2 and electric heater 4 stop working synchronously and then the water heater stops working.

Although typical embodiments of the present invention have been described herein, it can be realized that they are not intended to limit the extent of the present invention. For those skilled in the art, various alterations and modifications can be deprived from the present invention which should fall within the protection scope of the present invention.

PRACTICALITY IN INDUSTRY

The present invention is an energy and water saving water heater that can compose an integrated structure together with a bathroom, retrieve the heat in the waste hot water generated during bathing, and reuse waste water. The water heater perfects the function of a bathroom, provides convenience for consumers and saves water recourses and electricity recourses. It has a simple structure as integrated or separated and can be composed to an integrated structure with bathrooms having various kinds of shapes and sizes according to the detailed structure and position of the base or back of the bathrooms, which make a bathroom itself has the function of energy and water saving water heater and becomes a real bathroom and provide consumers with convenience.

The present invention can be applied in industry to obtain industrial production.

The invention claimed is:

1. A water heater especially for bathroom, is characterized in that, it includes a hair filter (1), a water self pumping pump (2), a heat exchanger (3), a heater (4), a tap water inlet valve (5), a controller (6), an operator (7), three water flow resistance amplifiers (8), a waste water tank (9) and pipes used for connections, the hair filter (1) is installed at the water outlet of a base of a bathroom; the water self pumping pump (2), the heat exchanger (3), the heater (4) and the controller (6) are installed together or separately in an empty cavity located at the lower part of a base (end tube) of the bathroom, or at a position for installing which is on the side wall or on the upper part of the base behind the back wall of the bathroom; the operator (7) is arranged on a position on the inside wall or on a back wall which is convenient to operate; the waste water tank (9) is installed at the outside top of the bathroom or on the wall above a toilet in a washroom of users and can provide tile toilet with water automatically by taking advantage of the height difference, the water self pumping pump (2) has a water inlet pipe-jointed with the hair filter (1) and a water outlet pipe-jointed with the waste water inlet (11) of the heat exchanger (3); the waste water outlet (13) of the heat exchanger (3) pipe-joints with the waste water inlet (10) of the waste water tank (9); the waste water outlet (15) of the waste water tank (9) pipe-joints with the water inlet of the toilet of users, and the overflow port (16) of the waste water tank pipe-joints with the waste water tank or water pipeline; the tap water inlet (12) of the heat exchanger (3) pipe-joints with the water outlet port of the tap water inlet valve of the bathroom, the water inlet port of the tap water inlet valve of the bathroom pipe-joints with a tap water pipeline of users after serially pipe-jointing with a water flow resistance amplifier (8), the tap water outlet (14) of the heat exchanger pipe-joints with the water inlet of the heater (4) after serially pipe-jointing with another water flow resistance amplifier (8); the water outlet of the heater (4) pipe-joints with a shower head (18) in the bathroom after serially pipe-jointing with a water flow resistance amplifier (8); the tap water inlet valve (5) is serially pipe-jointed on the proper position of the tap water pipeline of the water heater through a tube, the controller (6) has a input port electrically connected to the power of users and a output port electrically connected to the water self pumping pump (2), the heater (4), the tap water inlet valve (5) and the operator (7).

2. The water heater especially for bathroom according to claim 1 is characterized in that, the heater exchanger (3) adopts double-pipe heat exchanger or plate heat exchanger.

3. The water heater especially for bathroom according to claim 1 is characterized in that, the heater (4) is formed to compose an integrated structure with the heat exchanger (3) or to compose an integrated structure together with controller (6), water valve (5) and water flow resistance amplifier (8) with the invariable connections among them.

4. The water heater especially for bathroom according to claim 1 or 3 is characterized in that, the heater (4) uses electricity energy or fuel gas heat energy and is designed to work under multiple adjustable powers of 1 kw, 2 kw and 3 kw.

5. The water heater especially for bathroom according to claim 1 is characterized in that, the water flow resistance amplifier (8) is water pass-by pipelines sequence made of plastic insulation materials and is composed with only one pipe or multiple pipes serially connected to each other.

6. The water heater especially for bathroom according to claim 1 is characterized in that, the hair filter (1) is composed with upper cover of filter (25), filter body itself (26), fastening nut (27), filter net (28) and plastic pad (29).

7. The water heater especially for bathroom according to claim 2 is characterized in that, while adopting double-pipe heat exchanger as the heat exchanger (3), an inner pipe (19) adopts red copper pipe or aluminum pipe and an outer pipe (20) adopts corrugated plastic flexible pipe which are winded into spiral and set in a shell (22).

8. The water heater especially for bathroom according to claim 2 is characterized in that, while adopting plate heat exchanger as the heat exchanger (3), a partition selects red copper sheet, stainless steel sheet, aluminum sheet or galvanized steel sheet with the shape of spiral or overlapping plate-like.

9. The water heater especially for bathroom according to claim 7 is characterized in that, polyurethane insulation material or rock-wool is filled into the gaps among the pipes in the shell (22).

* * * * *